(12) United States Patent
Kwan et al.

(10) Patent No.: US 9,098,583 B2
(45) Date of Patent: Aug. 4, 2015

(54) SEMANTIC ANALYSIS DRIVEN SERVICE CREATION WITHIN A MULTI-LEVEL BUSINESS PROCESS

(75) Inventors: Hungtack Kwan, Grand Prairie, TX (US); Shiju Mathai, Carrollton, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 469 days.

(21) Appl. No.: 13/279,380

(22) Filed: Oct. 24, 2011

(65) Prior Publication Data

US 2013/0103676 A1    Apr. 25, 2013

(51) Int. Cl.
*G06F 17/30* (2006.01)
*G06F 9/44* (2006.01)

(52) U.S. Cl.
CPC .......... *G06F 17/30864* (2013.01); *G06F 8/30* (2013.01)

(58) Field of Classification Search
CPC .............................. G06F 17/30864; G06F 8/30
USPC ........................................................ 707/723
See application file for complete search history.

(56) References Cited

U.S. PATENT DOCUMENTS

| | | | |
|---|---|---|---|
| 7,562,254 B2 * | 7/2009 | Davis et al. | 714/16 |
| 7,653,618 B2 | 1/2010 | Andreev et al. | |
| 7,895,563 B2 | 2/2011 | Carlson et al. | |
| 2005/0015643 A1 * | 1/2005 | Davis et al. | 714/4 |
| 2007/0169103 A1 * | 7/2007 | Bhatkhande et al. | 717/170 |
| 2007/0282879 A1 * | 12/2007 | Degenkolb et al. | 707/101 |
| 2009/0049040 A1 | 2/2009 | Fay et al. | |
| 2009/0089039 A1 * | 4/2009 | Shufer et al. | 703/23 |

* cited by examiner

*Primary Examiner* — Sheree Brown
(74) *Attorney, Agent, or Firm* — Patents on Demand P.A.; Brian K. Buchheit; Scott M. Garrett (57) ABSTRACT

A multi-level business process interface associated with an incomplete Web service can be identified. The interface can be created within a user interface (UI) modeling tooling. The Web service can be associated with a business process. An interface specific metadata associated with the process interface can be determined. Service definitions for one or more existing Web service matching a portion of the interface specific metadata can be searched for semantically based on search depth parameters set by a user. A search result responsive to the searching can be returned. The search result can identify one or more existing Web services from a service registry.

20 Claims, 3 Drawing Sheets

FIG. 3

SEMANTIC ANALYSIS DRIVEN SERVICE CREATION WITHIN A MULTI-LEVEL BUSINESS PROCESS

BACKGROUND

The present invention relates to the field of Web service development and, more particularly, to semantic analysis driven service creation in a multi-level business process.

Web services are frequently associated with business processes which model necessary stages for achieving a business objective. The Web services can be an implementation of a business process, a portion of a business process, or multiple business processes. Existing Web services and are often used to create new services rapidly by leveraging software development practices such as software reuse. For example, two or more Web services can be combined into a single service which can provide greater functionality than the services individually.

Traditional Web service creation often requires manual searches for service definitions by using specific keywords to search for the definitions. The definitions can be retrieved from registries such as internal registry, an external registry, or cloud registry. Once retrieved service objects must be manually mapped to the service being created. This traditional process can be a time consuming endeavor and can also require industry specific knowledge to identify appropriate search keywords. That is, existing Web services can go unused due to difficulty in determining the service existence. For example, a service can be tagged with jargon keywords which can render the service difficult to find. Further, traditional approaches fail to permit searching low-level details (e.g., operations) of Web services and/or business processes.

BRIEF SUMMARY

One aspect of the present invention can include a system, an apparatus, a computer program product, and a method for semantic analysis driven Web service creation. A multi-level business process within a computing environment can be identified. The interface can be created within a user interface (UI) modeling tooling. The Web service can be associated with a business process. An interface specific metadata associated with the process interface can be determined. Service definitions for one or more existing Web service matching a portion of the interface specific metadata can be searched for semantically. A search result responsive to the searching can be returned. The search result can identify one or more existing Web services from a service registry.

Another aspect of the present invention can include an apparatus, a computer program product, a method, and a system semantic analysis driven Web service creation. A tooling engine can be able to automatically generate Web service artifacts associated with an interface of an incomplete Web service. The interface can be associated with interface specific metadata. The incomplete Web service can be associated with a business process. A data store can be configured to persist a search result associated with a semantic search. The search result can identify at least one existing Web service matching a portion of the interface specific metadata.

DETAILED DESCRIPTION

The present disclosure is a solution for semantic analysis driven service creation in a multi-level business process. In the solution, a tooling engine can be utilized to assist in automatically generating necessary artifacts for completing the creation of a Web service. The engine can determine interface metadata from a user defined interface which can be used to perform a semantic search. The search can utilize automatically established keywords, tags, and/or categories to identify existing services which can be utilized in creating the Web service. The tooling engine can return a ranked result set which can permit intelligent selection and generation of Web service artifacts. For example, the engine can automatically retrieve service objects, map relevant service objects, and generate an appropriate payload for validation of the Web service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
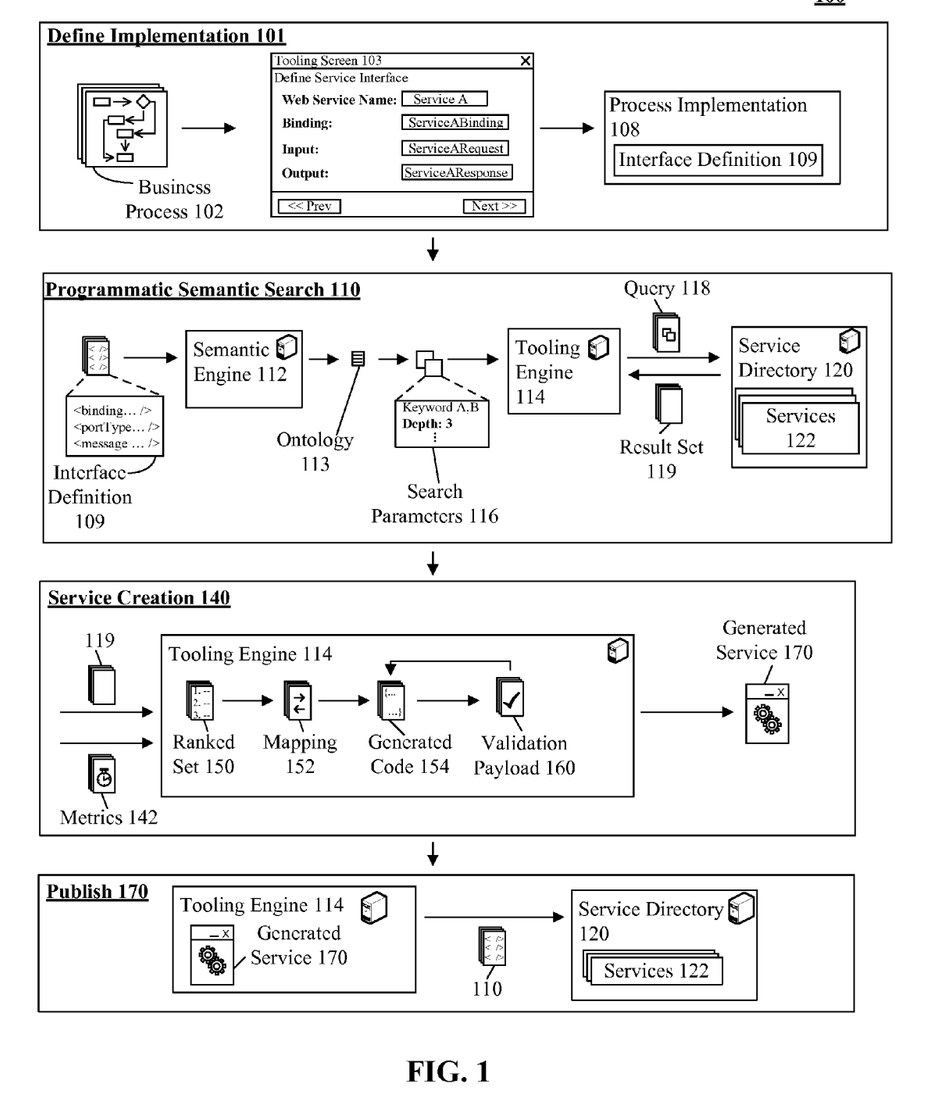
FIG. 1 is a schematic diagram illustrating a flow for semantic analysis driven service creation in a multi-level business process in accordance with an embodiment of the inventive arrangements disclosed herein.

FIG. 1 is a schematic diagram illustrating a flow 100 for semantic analysis driven service creation in a multi-level business process in accordance with an embodiment of the inventive arrangements disclosed herein. Flow 100 can be performed in the context of method 200 and system 300. Flow 100 can include stages 101, 110, 140, 170 and can include optional stages not shown herein. In flow 100, a business process 102 can be selected for implementation. The business process 102 can be a collection of related structured activities (e.g., tasks) which can produce a specific service and/or product. For example, a business process can be a series of workflows for a Web service for retrieving Web site user account details. The interface definition 109 can be defined within a modeling tool (e.g., tooling screen 103) and can be utilized to create an automatically generated service 170. That is, the disclosure can facilitate rapid and easy top-down Web service creation.

In define implementation 101, a business process 102 can be inputted into a tooling screen 103. Utilizing tooling screen 103, a process implementation 108 can be created. For example, the process implementation 108 can be a new Web service being created by a user. The process implementation 108 can include an interface definition 109. The interface definition 109 can be generated from user input received within tooling screen 103. For example, a developer can employ business process flowcharts to manually define an interface definition 109 for business process 102. The interface definition 109 can be an entity specifying the location of the implementation 108 (e.g., URL) and the operations the implementation exposes. In one instance, the interface definition 109 can be a Web Services Description Language (WSDL) document. In the instance, the definition 109 can include, but is not limited to, a binding, a port type, a message, a type, and the like. That is, interface definition 109 can specify requisite messages which can be used by the Web service associated with the process implementation.

In programmatic semantic search 110, the interface definition 109 can be conveyed to a semantic engine 112. Semantic engine 112 can utilize traditional and/or proprietary techniques to establish an ontology 113. One or more search parameters 116 can be extracted from the ontology 113. In instances where an ontology 113 is not available, known external service directories can be queried to obtain metadata which can be utilized to generate an appropriate ontology. Search parameters 116 can be employed to aid in locating existing services which can be useful to building out implementation 108 functionality. Search parameters 116 can include, but is not limited to, a keyword, a tag, a category, and the like. In one embodiment, search parameters 116 can include user specified options including a search depth parameter, a search string, and the like. In the instance, search parameters can utilize traditional Boolean operations and search depth options to automatically improve search results. For example, a search depth parameter can be specified in a numerical value (e.g., depth=3) permitting a user to search for specific process operations matching user specified criteria. It should be appreciated that search depth parameters can be specified using traditional and/or proprietary mechanisms. For example, the search depth parameter can be a search string keyword (e.g., depth: object). Search parameters 116 can be utilized by tooling engine 114 to perform query 118.

Query 118 can be conveyed to service directory 120 which can return a result set 119. Query 118 can include multiple search queries and/or parameters for identifying an appropriate service. In one instance, query 118 can be a SPARQL Protocol and Resource Description Framework (RDF) Query Language Query (SPARQL). Query 118 can be fully customizable utilizing user established settings, automatically established settings, and the like. In one instance, service directory 120 can be an internal service directory maintained within the tooling engine 114. In another instance, service directory 120 can be an external service directory communicatively linked to engine 114. For example, directory 120 can be a cloud based service registry accessible to tooling engine 114. Result set 119 can be a semantic search data set including identification of services 122 which match query 118 (e.g., search parameters 116). Result set 119 can be conveyed to engine 114 which can perform necessary actions to facilitate automated process implementation 108 assembly.

In service creation 140, result set 119 and metrics 142 can be utilized to create generated service 170. Engine 114 can employ metrics 142 to provide a ranked set 150 which can be an ordered instance of result set 119. For example, ranked set 150 can be a list of services 122 matching query 118 and/or search parameters 116. Metrics 142 can be one or more data sets of measures associated with a Web service. Metrics 142 can include, but is not limited to performance metrics, software metrics, and the like. For example, a metric 142 can be a popularity of a Web service based on service usage during a one week period. In one instance, ranked set 150 can be automatically generated and mapping 152 can be produced. In another instance, ranked set 150 can be automatically generated and await approval from a user before mapping 152 is produced. Metrics 142 can be automatically and/or manually conveyed to engine 114. For example, a user interface associated with tooling engine 114 can permit a developer to select specific metrics which can be used to aid in the creation of service 170.

One or more services 122 from ranked set 150 can be utilized to programmatically create mapping 152. Mapping 152 can be an artifact permitting association of service and/or service objects to an interface definition (e.g., interface metadata). In one instance, mapping 152 can be an Extensible Markup Language (XML) document for associating relevant service objects to implementation 108. Mapping 152 can be employed by engine 114 to provide generated code 154. Generated code 154 can be an entity including one or more source code documents. For example, generated code 154 can be a JAVA 2 ENTERPRISE EDITION source code document. Generated code 154 can be employed to create validation payload 160.

Validation payload 160 can be an artifact for verifying the appropriate operation of code 154. Validation payload 160 can include unit testing artifacts which can automate code 154 testing. In one instance, code 154 can be modified based on outcome of validation testing. That is, code 154 can be automatically tailored to fit specific requirements. In one embodiment, validation can be manually approved to enable user control of the flow. In another embodiment, one or more rules can be established to enable automation of approval.

When validation of code 154 is complete, generated service 170 can be created. Service 170 can be a completely functional Web service based on interface definition 109. In one embodiment, service 170 can conform to a Representational State Transfer (REST) architecture. In another embodiment, service 170 can conform to a Service Oriented Architecture (SOA). Service 170 can be optionally deployed based on engine 114 settings. In one embodiment, service 170 can be published to a service directory (e.g., stage publish 170).

In publish 170, engine 114 can publish service 170 to service directory 120. In one instance, a publish artifact can be conveyed to directory 120 to register service within a network. In one embodiment, publish artifact can be a WSDL document (e.g., interface definition 109). Service directory 120 can update services 122 to include generated service 170 availability. In one instance, ontology and metric information associated with the service 170 can be published to service directory 120. In the instance, the published data can be export to external registries (e.g., cloud service directory).

Drawings presented herein are for illustrative purposes only and should not be construed to limit the invention in any regard. It should be appreciated that disclosure can utilize external resources (e.g., semantic engine 112) to accomplish flow 100. It should be understood that stage 170 can be an optional phase of the disclosure. The flow 100 can be associated with traditional and/or proprietary Web service frameworks including, but not limited to, IBM WEB TOOLS PLATFORM, Apache Axis, Spring Framework, Web Services Invocation Framework, and the like. In one instance, flow 100 can utilize Java Application Programming Interface (API) for XML Web Services (JAX-WS) technologies.

Figure 2:
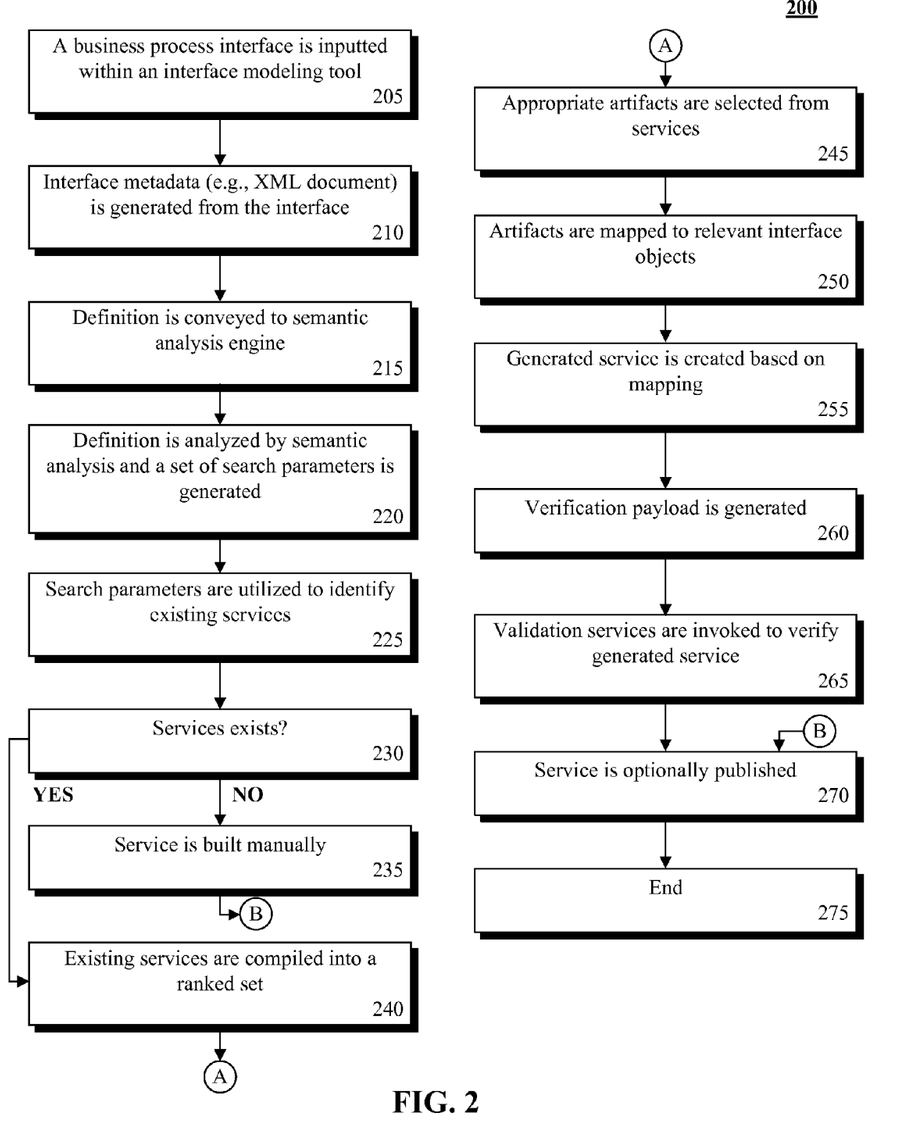
FIG. 2 is a schematic diagram illustrating a method for semantic analysis driven service creation in a multi-level business process in accordance with an embodiment of the inventive arrangements disclosed herein.

FIG. 2 is a schematic diagram illustrating a method 200 for semantic analysis driven service creation in a multi-level business process in accordance with an embodiment of the inventive arrangements disclosed herein. Method 200 can be performed in the context of flow 100 and system 300. In method 200, a business process can be associated with a process implementation such as a Web service. The Web service can be automatically generated from a user provided interface definition. The generation can be aided in part by user input (e.g., user approval actions).

In step 205, a business process interface can be inputted within a Web service modeling tool. The business process can be manually and/or automatically inputted into the modeling tool. In one embodiment, a business process artifact conforming to a Business Process Modeling Notation (BPMN) format can be inputted into the modeling tool. The modeling tool can be a software program able to receive interface definition details associated with a process implementation. In one instance, the modeling tool can be an assisted creation tool (e.g., wizard) within an integrated development environment (IDE). For example, modeling tool can be a Web service creation screen of an IBM ECLIPSE IDE.

In step 210, an interface metadata (e.g., Extensible Markup Language document) can be generated from the interface. In one instance, metadata can include metrics associated with the interface. In one instance, a "summary" Extensible Markup Language document can be created. In the instance, the document can include context information about the interface extracted from metadata entered by a user, a list of vocabulary extracted from the interface definition, and the like. In step 215, the definition can be conveyed to a semantic analysis engine. In step 220, the definition can be analyzed by the semantic analysis and a set of search parameters can be generated.

In step 225, the search parameters can be utilized to identify existing services which can be utilized in Web service creation. In step 230, if services exist, the method can continue to step 240, else proceed to step 235. If a matching service is found, the service interface information can be retrieved from an internal service directory (e.g., directory 335). In one instance, service discovery can be performed utilizing Web Services Dynamic Discovery (WS-Discovery) communication protocol. When a matching service is not located, external registries can be queried for relevant artifacts. In step 235, the service can be built manually by an appropriate user. When a matching service is not located within external registries, the service can be defined manually. That is, the service can be new and user input via existing tooling is required to create the service. In one instance, a notification of service absence can be conveyed to one or more users. In the instance, tooling configuration can permit notification to be conveyed to an administrator, a developer, a development team, a project manager, and the like. For example, an email notification can be transmitted to a project team member when a service requires manual creation.

In step 240, existing services can be compiled into a ranked set. In one embodiment, the ranked set can include a score for each existing service identified. In the embodiment, the score can be automatically computed utilizing one or more rulesets. In one instance, the highest ranked service can be automatically selected to be utilized in the generation of the Web service. In step 245, appropriate artifacts can be selected from relevant services. In step 250, artifacts can be mapped to relevant interface objects. In step 255, generated service can be created based on mapping. In step 260, a verification payload can be generated. In step 265, validation services can be invoked to verify generated service. In one instance, one or more external services can be invoked to verify the generated service. In step 250, the service can be optionally published. In step 275, the method can end.

Drawings presented herein are for illustrative purposes only and should not be construed to limit the invention in any regard. Method 200 can be performed in parallel or serial. It should be appreciated that, method 200 can be performed in real-time or near real time. In one instance, method 200 can be triggered via a user interface functionality. For example, a file menu entry can permit assisted and targeted Web service development from an initial interface definition. It should be appreciated that method 200 can leverage semantic Web technologies to enable method to be enacted.

Figure 3:
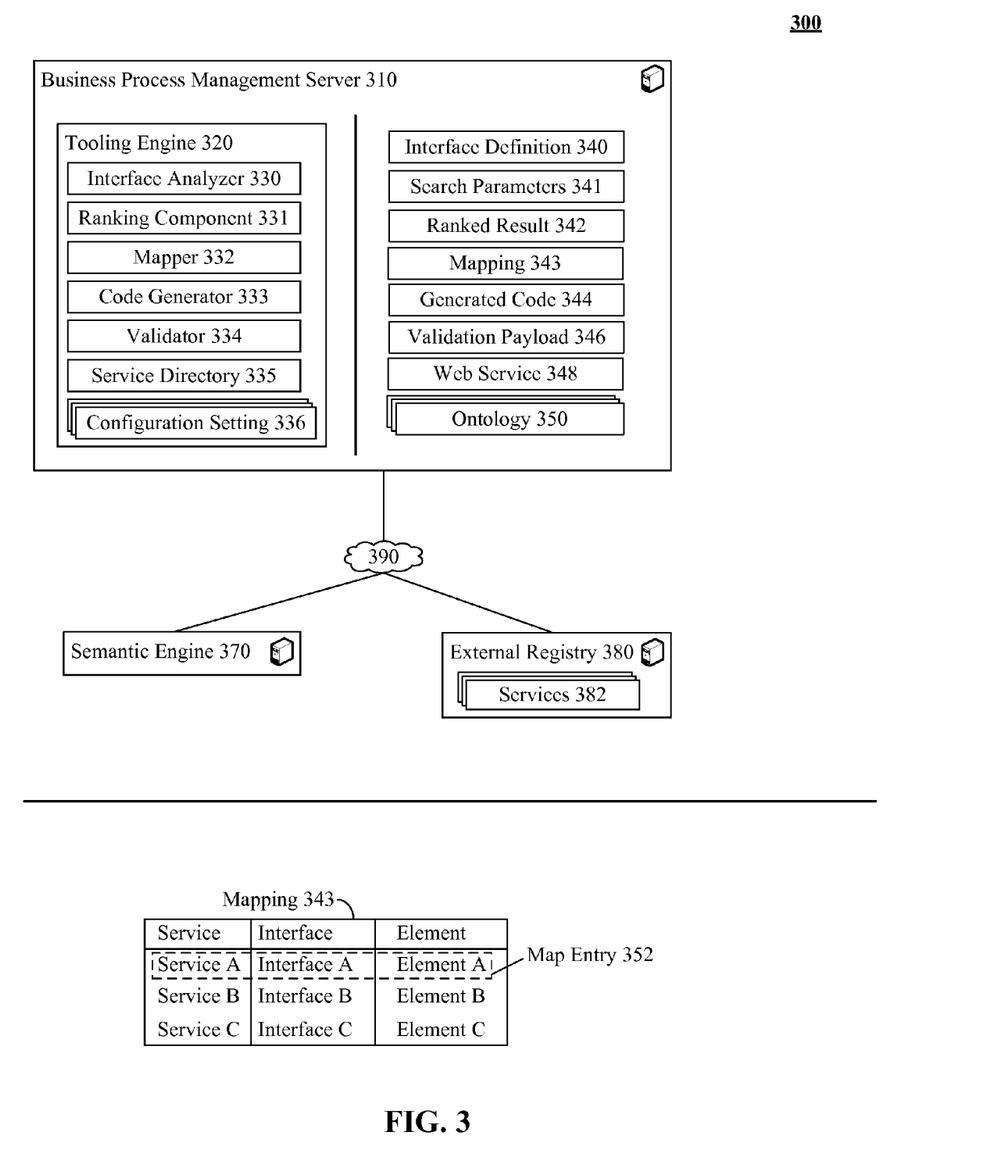
FIG. 3 is a schematic diagram illustrating a system for semantic analysis driven service creation in a multi-level business process in accordance with an embodiment of the inventive arrangements disclosed herein.

FIG. 3 is a schematic diagram illustrating a system 300 for semantic analysis driven service creation in a multi-level business process in accordance with an embodiment of the inventive arrangements disclosed herein. System 300 can be performed in the context of flow 100 and method 200. In system 300, a tooling engine 320 can permit automated creation of Web service 348 from interface definition 340. Utilizing map entry 352 of mapping 343, definition 340 can be mapped to existing service objects which can be employed to produce code 344. System 300 components can be communicatively linked via network 390. In one embodiment, system 300 can conform to a service oriented architecture (SOA).

Business process management server 310 can be a hardware/software entity permitting the processing of tooling engine 320. Server 310 can include, but is not limited to, business process design, process modeling, process handling, process monitoring, process optimization, process re-engineering, and the like. In one embodiment server 310 can be an IBM Business Process Choreography server. Server 310 can include multiple servers which can be geographically distributed throughout a network (e.g. network 390). Server 310 can store artifacts 340-348 within one or more data stores associated with the server 310. It should be appreciated that artifacts 340-348 can be persisted for re-use enabling rapid development of similar Web services. For example, artifacts 340-348 can be associated with a Web service software project stored and/or managed by server 310.

Tooling engine 320 can be a hardware/software component for permitting automated generation of a Web service 348 from definition 340. Engine 320 can include, but is not limited to, interface analyzer 330, ranking component 331, mapper 332, code generator 333, validator 334, service directory 334, configuration setting 336, and the like. Engine 320 functionality can include interaction with a user interface, integration with existing tooling (e.g., tooling extension), and the like. For example, engine 320 can be a backend component of a Web Services Description Language (WSDL) Editor. In one embodiment, engine 320 can provide tooling extensions to existing tooling features enabling rapid Web service development. For example, tooling engine 320 can be a feature extension of a WEB TOOLS PLATFORM of an IBM ECLIPSE Integrated Development Environment (IDE).

Interface analyzer 330 can be a hardware/software entity for examining definition 340. Analyzer 330 functionality can include definition validation (e.g., input validation), metadata collection, metadata analysis, and the like. Analyzer 330 can be automatically invoked during a process implementation activity. For example, when a software wizard for defining an interface is completed, the analyzer can examine the interface and collect metadata. Analyzer 330 can utilize traditional and/or proprietary metadata collection techniques. Metadata can include, but is not limited to, a service name, a namespace, a mode, a policy, a security setting, a revision value, a status, a relationship value, and the like.

Ranking component 331 can be a hardware/software element for creating ranked results 342. Component 331 functionality can include, but is not limited to, search parameter creation, semantic engine 370 communication, and the like. In one instance, the component can inspect the interface definition 340 and associated metadata to create appropriate Extensible Markup Language (XML) for semantic analysis to be performed (e.g., semantic query). In the instance, relevant services associated with the service directory 335 can be retrieved based on results from semantic engine query. In one embodiment, if more than one matching services are identified, the component can generate a score to rank matching services based on pre-defined metrics (e.g., metrics 142). In another embodiment, interfaces which have no matching ontology, the component can attempt to query service directories from cloud service providers (e.g., registry 380) based on results of the semantic engine 370. In the embodiment, if a match is determined, the component can import external interfaces and associated metadata into the service directory 335 and the result (e.g., ranked result 342) can be updated to reflect the change.

Mapper 332 can be a hardware/software component for automatically generating mapping 343. Mapper 332 functionality can include, but is not limited to, object retrieval, attribute determination, mapping validation, and the like. In one instance, mapper 332 can automatically map all elements between a user defined interface (e.g., interface 340) and the selected service within ranked result 342. In one embodiment, when an interface or attribute cannot be matched, a user can be prompted to perform manual matching activities.

Code generator 333 can be a hardware/software element for dynamically creating generated code 344. Generator 333 functionality can include, but is not limited to, mapping 343 processing, source code language selection, framework selection, and the like. Generator 333 can output traditional and/or proprietary source code artifacts. Artifacts can conform to one or more computing languages including, but not limited to, JAVA, PHP Hypertext Processor (PHP), JAVASCRIPT, and the like. Generator 333 can yield appropriate executable code based on the output of mapper 332. For example, generator 333 can create an appropriate JAVA bean based mapping 343. Generator 333 can create a validation payload 346 which can be utilized by validator 334.

Validator 334 can be a hardware/software entity for validating code 344. Validator 344 functionality can include, but is not limited to, code testing, validation notification, and the like. Validator 334 can dynamically validate code 344 utilizing payload 346 and/or a manually created payload. In one embodiment, validator 334 can present the outcome of the validation within a user interface. In the embodiment, changes can be performed which can allow user feedback to control Web service 348 creation.

Service directory 335 can be a hardware/software element for storing service metadata associated with services (e.g., services 382). Directory 335 functionality can include, but is not limited to, metadata storage, importing capabilities, publishing capabilities, and the like. In one instance, directory 335 can be an IBM WEBSPHERE SERVICE REGISTRY AND REPOSITORY. In one embodiment, directory 335 can store interface definitions for known interfaces and associated metadata.

Configuration setting 336 can be one or more rulesets for establishing the behavior of engine 320. Setting 336 can include, but is not limited to, interface analyzer 330 options, ranking component 331 parameters, mapper 332 settings, code generator 333 options, validator 334 settings, service directory 335, and the like. Setting 336 can be automatically and/or manually configured. For example, setting 336 can be presented within a user interface which can permit configuration changes to be propagated to engine 320.

Interface definition 340 can be associated with one or more messages that Web service 348 can perform. Messages can be grouped together into operations which can be specified by input and/or output messages. In one instance, interface definition 340 can be an extension to an existing interface. Definition 340 can conform to an Extensible Markup Language format.

In one embodiment, search parameters 341 can be customized by a user prior to searching a service directory. For example, one or more search strings associated with the search parameters 341 can be presented within a user interface for editing purposes. In one instance, search parameters 341 can be presented within a search user interface. In the user interface, customizations including, but not limited to, keyword modification, query optimization, and the like can be performed.

Ranked result 342 can include one or more services identified by search parameters 341. Result 342 can include, service location, service information, service metadata, and the like. In one instance, ranked result 342 can be dynamically organized based on one or more criteria. Criteria can include, but is not limited to, version, author, rating, and the like.

Mapping 343 can include, but is not limited to, service information, interface information, service objects information, object metadata, and the like. In one instance, mapping 343 can include multiple services, multiple objects, and the like. For example, map entry 352 can link an Element A of a Service A to Web service 348. Mapping 343 can be persisted within a data store and can be dynamically updated when changes to services occur. For example, when services 382 are changed, mapping 343 can be automatically updated to reflect the change.

Generated code 344 can be associated with a source code file, an object file, a binary file (e.g., executable code), and the like. Code 344 can include, but is not limited to, a JAVA source code file, a C++ source code file, and the like. Code 344 can include traditional and/or proprietary source code artifacts which can support compilation, builds, validation, deployment, and the like. In one embodiment, code 344 can be associated with a client based program. In the embodiment, code 344 can be a validation client which can be utilized to test Web service 348.

Validation payload 346 can be associated with code 344 which can include one or more data sets, algorithms, metadata and the like. In one instance, payload 346 can conform to a JAVA payload interface class. Payload 346 can be utilized to perform traditional and/or non-traditional automated testing. Payload 346 can permit functional testing, load driven testing, data driven testing, and the like. Payload 346 can include one or more custom constraints, limitations, and the like.

Web service 348 can include one or more Application Programming Interface functionality. In one instance, service 348 can conform to Web 2.0 standards. Web service 348 can conform to one or more Web service specifications including, but not limited to, WS-Notification, WS-Policy, WS-Metada-taExchange, Web Services Semantic (WSDL-S), Web Services Resource Framework, WS-Security, WS-ReliableMessaging, WS-BPEL, and the like.

Ontology 350 can be associated with one or more traditional and/or proprietary ontology languages. Ontology languages can include, but are not limited to, Resource Description Framework (RDF), Ontology Web Language (OWL), and the like. Ontology 350 can conform to rules including, but not limited to, Semantic Web Rule Language (SWRL), Rule Interchange Format, and the like. Ontology 350 vocabulary can include, but is not limited to, Dublin Core, Semantically-Interlinked Online Communities, Description Of A Project (DOAP), and the like.

Semantic engine 370 can be a hardware/software component able to generate an ontology 350 for an interface definition 340. Engine 370 can conform to traditional and/or proprietary technologies. Engine 370 functionality can include metadata analysis, text analysis, and the like. In one embodiment, engine 370 can utilize service information from service directory 335 and/or registry 380 to build an ontology 350. Engine 370 can include one or more semantic technologies. Engine 370 can be a networked computing element, distributed computing element and the like.

External registry 380 can be a communicatively linked Web services directory storing information about services 382. Registry 380 can be a traditional and/or proprietary service directory. Registry 380 can be a cloud-based registry associated with one or more networks. For example, registry 380 can be a Universal Description, Discovery and Integration (UDDI) node within a cloud. Services 382 can be information associated with one or more Web services available within network 390. Services 382 can include public services, non-public services, and combinations thereof.

Network 390 can be an electrical and/or computer network connecting one or more system 300 components. Network 390 can include, but is not limited to, twisted pair cabling, optical fiber, coaxial cable, and the like. Network 390 can include any combination of wired and/or wireless components. Network 390 topologies can include, but is not limited to, bus, star, mesh, and the like. Network 390 types can include, but is not limited to, Local Area Network (LAN), Wide Area Network (WAN), VPN and the like. Network 390 can include, but is not limited to, an intranet, an internet, an extranet, and the like.

Drawings presented herein are for illustrative purposes only and should not be construed to limit the invention in any regard. System 300 can be one embodiment of the disclosure and should not be construed to limit the invention in any regard. Engine 320 can be a network element, distributed computing element, and the like. In one instance, system 300 can be a distributed computing environment. It should be appreciated that directory 335 and/or registry 380 can be Universal Description, Discovery and Integration (UDDI) compliant elements. System 300 can utilize one or more traditional and/or proprietary network communication protocols. Communication protocols can include, but is not limited to, Transport Control Protocol, Internet Protocol, User Datagram Protocol (UDP), Hypertext Transport Protocol, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for semantic analysis driven service creation comprising:
    identifying, by at least one processor executing program instructions, a multi-level business process interface within a computing environment associated with an incomplete Web service, wherein the incomplete Web service lacks an executable code, wherein the interface is created within a user interface (UI) modeling tooling, wherein the Web service is associated with a business process;
    determining, by at least one processor executing program instructions, an interface definition from the identified business process interface;
    generating, by at least one processor executing program instructions, an interface specific metadata from the interface definition; and
    generating, by at least one processor executing program instructions, the executable code for the incomplete Web service based on semantically, by at least one processor executing program instructions, searching service definitions for at least one existing Web service matching at least a portion of the interface specific metadata; and
    obtaining returning, a search result responsive to the searching; when the search result identifies, by at least one processor executing program instructions, at least one existing Web service from a service registry, the at least one existing Web service is presented and utilized for generating the executable code for the incomplete Web service; and when the search result fails to identify, by at least one processor executing program instructions, at least one existing Web service from a service registry, the executable code conforming to the interface specific metadata is generated automatically.

2. The method of claim 1, wherein the interface is associated with at least one of an Enterprise Generation Language (EGL) and a Web Services Description Language (WSDL).

3. The method of claim 1, wherein the method further comprises automatically determining at least one of a keyword, a tag, and a category to support the searching.

4. The method of claim 1, wherein the search result is utilized to automatically mapping a retrieved service object associated with the existing Web service to an attribute of the interface.

5. The method of claim 1, wherein the executable code to complete the incomplete Web service is automatically generated.

6. The method of claim 1, wherein the method further comprises:
    establishing an ontology based on the interface definition; and
    extracting one or more search parameters from the ontology for the semantic searching.

7. The method of claim 4, wherein a payload is dynamically generated from the retrieved service object associated with the existing Web service, wherein the payload is a validation artifact for verifying operation of the service object.

8. The method of claim 1, wherein the search result is automatically ranked based on pre-defined metrics.

9. The method of claim 1, further comprising:
    identifying at least one business process and a business process operation within the search result.

10. The method of claim 1, wherein the search depth of the semantically searching is associated with the user specified search depth parameter.

11. A system for semantic analysis driven service creation comprising:
    one or more processors;
    one or more memories;
    program instructions stored in the one or more memories and able to be executed by the one or more processors;
    a semantic engine, comprising at least a subset of the program instructions, configured to:
        obtain interface definition associated with a business process interface within a computing environment associated with an incomplete Web service lacking an executable code, wherein the incomplete Web service is associated with a business process;
        establish an ontology based on the interface definition; and
        extract one or more search parameters from the ontology to create a search query;
    a tooling engine, comprising at least a subset of the program instructions, configured to:
        execute the search query to semantically search for at least one existing Web service matching with the search query; and
        generate the executable code for the incomplete Web service utilizing the at least one existing Web service; and
    a data store, comprising a non-transitory storage medium, configured to persist a search result associated with the semantic search.

12. The system of claim 11, wherein the tooling engine creates a search model, wherein the search model includes at least one of a keyword, a tag, and a category associated with the interface specific metadata.

13. The system of claim 11, wherein the tooling engine automatically generates at least one of an Enterprise Generation Language (EGL) source code and a WSDL artifact from the interface specific metadata.

14. The system of claim 11, wherein the tooling engine automatically discovers a plurality of Web services within a multi-level services framework.

15. The system of claim 14, wherein the plurality of Web services comprises of at least one of a client service, a server hosted service, and an external service.

16. The system of claim 11, wherein the search result is automatically ranked based on pre-defined metrics.

17. A computer program product comprising a non-transitory computer readable storage medium having computer usable program code embodied therewith, the computer usable program code comprising:
    computer usable program code stored in the non-transitory computer readable storage medium, if said computer usable program code is processed by a processor it is operable to identify a process interface associated with an incomplete Web service, wherein the incomplete Web service lacks an executable code portion, wherein the interface is created within a user interface (UI) modeling tooling, wherein the Web service is associated with a business process;

computer usable program code stored in the non-transitory computer readable storage medium, if said computer usable program code is handled by a processor it is operable to determine an interface definition from the identified process interface;

computer usable program code stored in the non-transitory computer readable storage medium, if said computer usable program code is handled by a processor it is operable to generate, by at least one processor executing program instructions, an interface specific metadata from the interface definition;

computer usable program code stored in the non-transitory computer readable storage medium, if said computer usable program code is handled by a processor it is operable to semantically searching service definitions for at least one existing Web service matching at least a portion of the interface specific metadata; and computer usable program code stored in the non-transitory computer readable storage medium, if said computer usable program code is handled by a processor it is operable to when the search result identifies at least one existing Web service from a service registry:

presenting the at least one existing Web service;

mapping the at least one existing Web services to the interface definition; and enabling the Web service from the interface.

18. The computer program product of claim 17, wherein the search automatically determines at least one of a keyword, a tag, and a category to support the searching.

19. The computer program product of claim 18, wherein the search result is utilized to automatically map a retrieved service object associated with the existing Web service to an attribute of the interface.

20. The computer program product of claim 18, wherein the executable code to complete the incomplete Web service is automatically generated.

* * * * *